US012681778B2

(12) United States Patent
Singh

(10) Patent No.: US 12,681,778 B2
(45) Date of Patent: Jul. 14, 2026

(54) INTELLIGENT METHOD TO MERGE APPLICATION PROGRAMMING INTERFACE (API) LEVERAGING GENERATIVE AI AND PROMPT

(71) Applicant: Bank of America Corporation, Charlotte, NC (US)

(72) Inventor: Shailendra Singh, Maharashtra (IN)

(73) Assignee: Bank of America Corporation, Charlotte, NC (US)

( * ) Notice: Subject to any disclaimer, the term of this patent is extended or adjusted under 35 U.S.C. 154(b) by 476 days.

(21) Appl. No.: 18/372,221

(22) Filed: Sep. 25, 2023

(65) Prior Publication Data

US 2025/0103401 A1      Mar. 27, 2025

(51) Int. Cl.
| | |
|---|---|
| *G06F 9/54* | (2006.01) |
| *G06F 11/3604* | (2025.01) |
| *G06F 11/3668* | (2025.01) |
| *H04L 9/00* | (2022.01) |

(52) U.S. Cl.
CPC ............ *G06F 9/54* (2013.01); *G06F 11/3612* (2013.01); *G06F 11/3688* (2013.01); *H04L 9/50* (2022.05)

(58) Field of Classification Search
None
See application file for complete search history.

(56) References Cited

U.S. PATENT DOCUMENTS

| | | |
|---|---|---|
| 9,838,830 B2 | 12/2017 | Lyons |
| 9,928,034 B2 | 3/2018 | Merrill, III |
| 9,996,315 B2 | 6/2018 | Barnes, Jr. |
| 10,013,878 B2 | 7/2018 | Ricci et al. |
| 10,073,979 B2 | 9/2018 | Von Kaenel et al. |
| 10,162,805 B2 | 12/2018 | Grigorovitch et al. |
| 10,372,518 B2 | 8/2019 | O'Kennedy et al. |
| 10,459,977 B2 | 10/2019 | Maharajh et al. |
| 10,621,183 B1 | 4/2020 | Chatterjee et al. |
| 10,708,672 B2 | 7/2020 | Hindle et al. |
| 10,747,547 B2 | 8/2020 | Carrier et al. |
| 10,880,243 B2 | 12/2020 | Rodriguez et al. |
| 11,146,574 B2 | 10/2021 | Muddu et al. |
| 11,288,280 B2 | 3/2022 | Padmanabhan et al. |
| 11,409,744 B2 | 8/2022 | Shah et al. |
| 11,538,029 B2 * | 12/2022 | Young ................. G06F 18/2431 |

(Continued)

FOREIGN PATENT DOCUMENTS

EP        3564829 A1      11/2019

*Primary Examiner* — Van H Nguyen

(74) *Attorney, Agent, or Firm* — Banner & Witcoff, Ltd.

(57) ABSTRACT

An intelligent technical procedure to merge two or more application programming interfaces (APIs) leveraging generative AI is disclosed. API metadata is extracted from two or more APIs (e.g., name of API, endpoints, request/response formats (JSON or XLM), authentication mechanism (API keys, OAuth, or JWT tokens), rate limits, error codes, error messages, version scheme and API documentation etc.) to formulate and generate new API based on user prompt. Using Abstract Syntax tree (AST) advance deep learning generative AI algorithms like Generative pre-trained transformer (GPT) or the like, the method can merge and construct new API based on user's requirement prompt. Method leverages smart contracts to test new generated API and deploy API in desired environment based on blockchain consent protocol to manage API.

14 Claims, 7 Drawing Sheets

(56)  References Cited

U.S. PATENT DOCUMENTS

| 11,720,537 | B2 | | 8/2023 | Anwar et al. | |
| 12,061,600 | B2 | * | 8/2024 | Chamarthy | G06F 16/2386 |
| 12,284,289 | B2 | * | 4/2025 | Singh | H04L 9/50 |
| 2020/0118092 | A1 | * | 4/2020 | Gauvreau | G06F 16/2246 |
| 2020/0401996 | A1 | * | 12/2020 | Vadlamudi | G06Q 50/02 |
| 2022/0187870 | A1 | | 6/2022 | Hotelling | |
| 2024/0152917 | A1 | * | 5/2024 | Singh | G06N 3/044 |

* cited by examiner

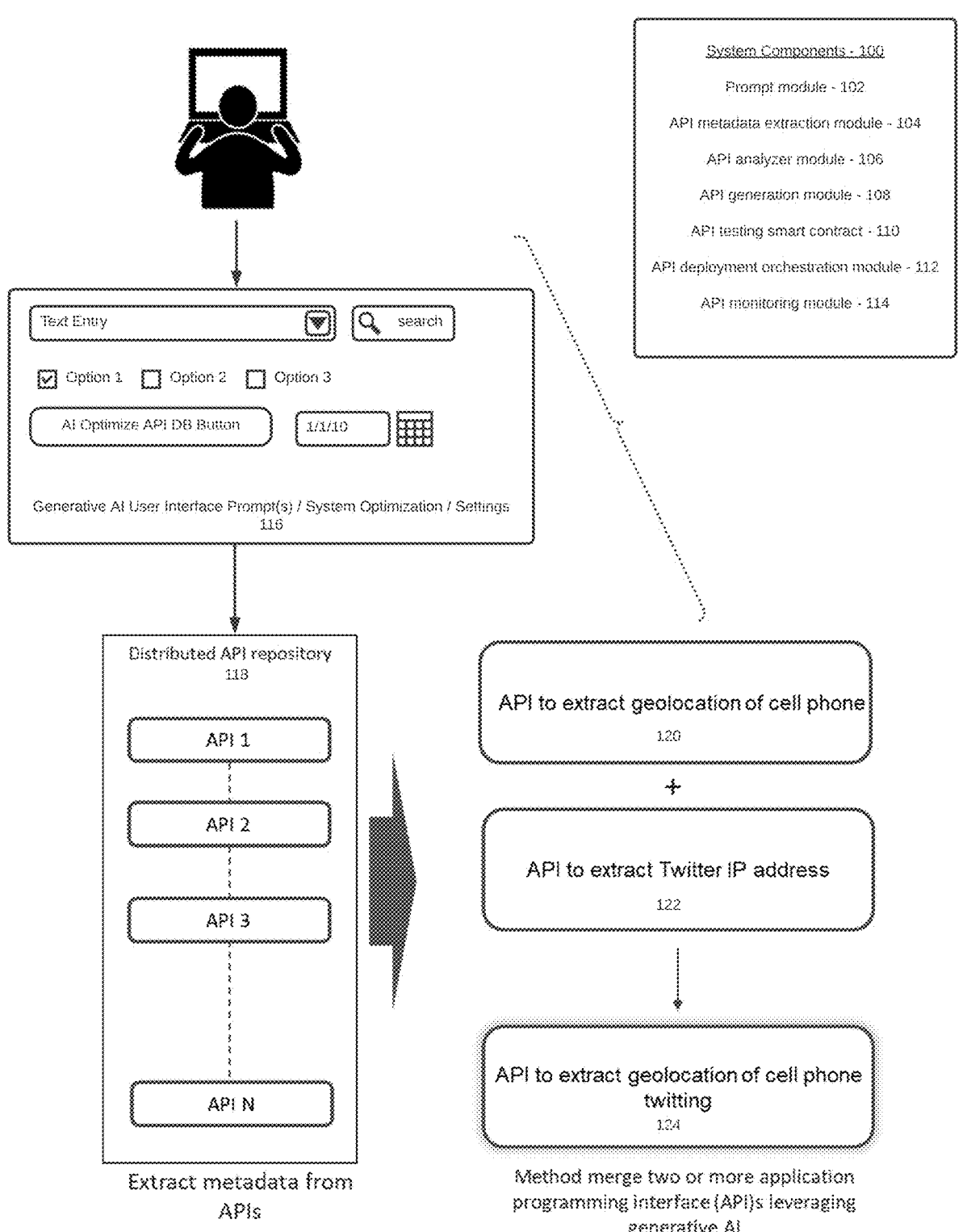

System Components - 100

Prompt module - 102

API metadata extraction module - 104

API analyzer module - 106

API generation module - 108

API testing smart contract - 110

API deployment orchestration module - 112

API monitoring module - 114

Text Entry     search

☑ Option 1   ☐ Option 2   ☐ Option 3

AI Optimize API DB Button     1/1/10

Generative AI User Interface Prompt(s) / System Optimization / Settings
116

Distributed API repository
118

API 1

API 2

API 3

API N

Extract metadata from APIs

API to extract geolocation of cell phone
120

API to extract Twitter IP address
122

API to extract geolocation of cell phone twitting
124

Method merge two or more application programming interface (API)s leveraging generative AI

FIG. 1

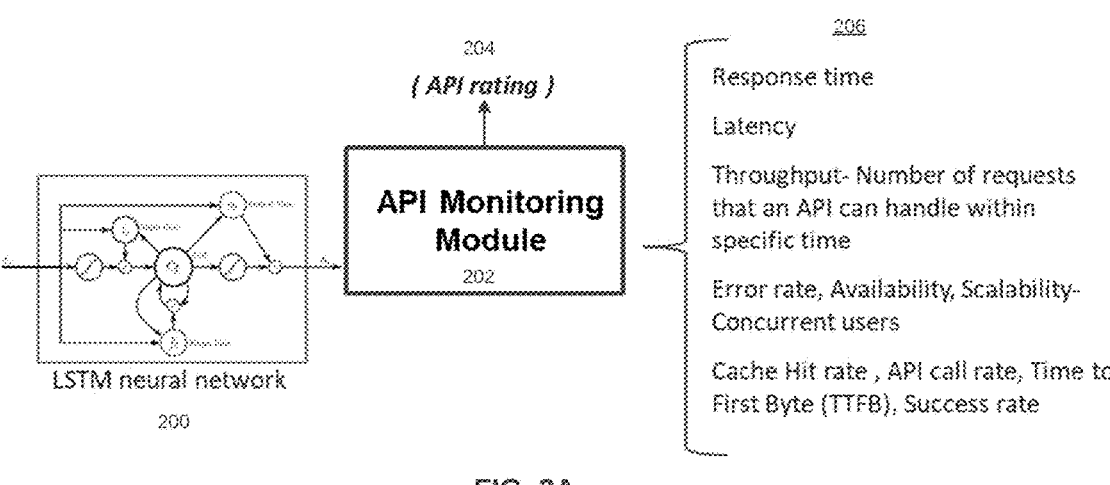

204

*( API rating )*

206

Response time

Latency

Throughput- Number of requests that an API can handle within specific time

Error rate, Availability, Scalability- Concurrent users

Cache Hit rate , API call rate, Time to First Byte (TTFB), Success rate

API Monitoring Module

202

LSTM neural network

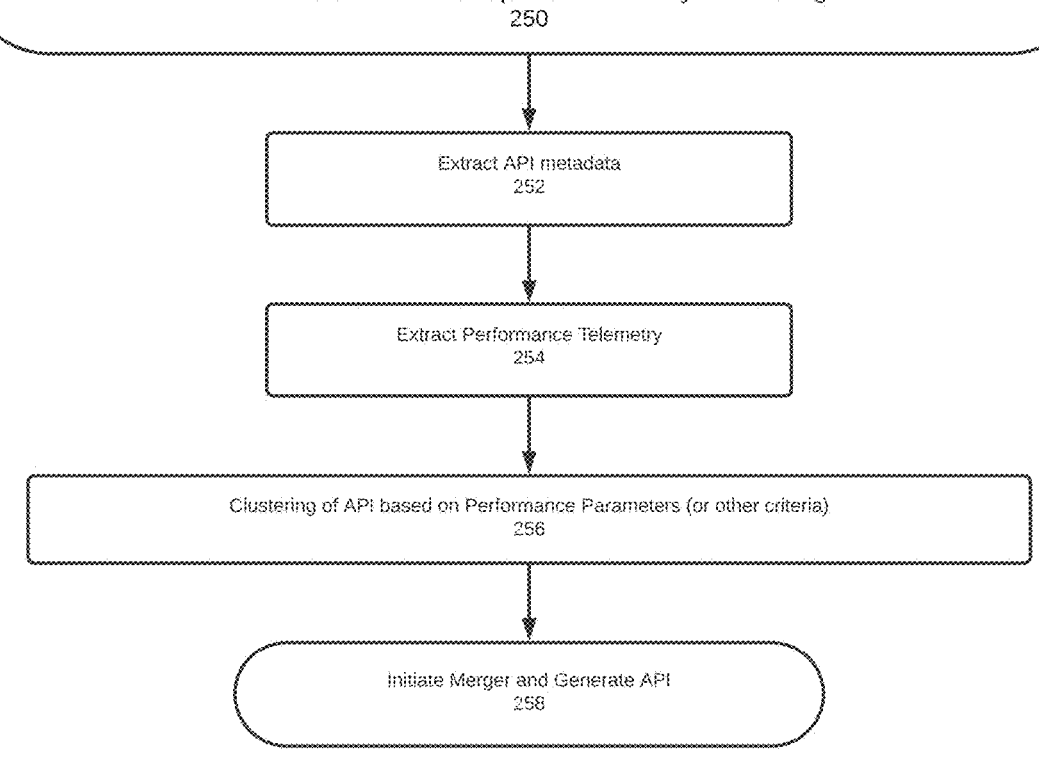

Method intelligently select APIs whose functionalities need to be merged to construct one API based on clustering. Selection of such API is based on API performance analysis clusteringMethod intelligently select APIs whose functionalities need to be merged to construct one API based on clustering. Selection of such API is based on API performance analysis clustering

250

Extract API metadata

252

Extract Performance Telemetry

254

Clustering of API based on Performance Parameters (or other criteria)

256

Initiate Merger and Generate API

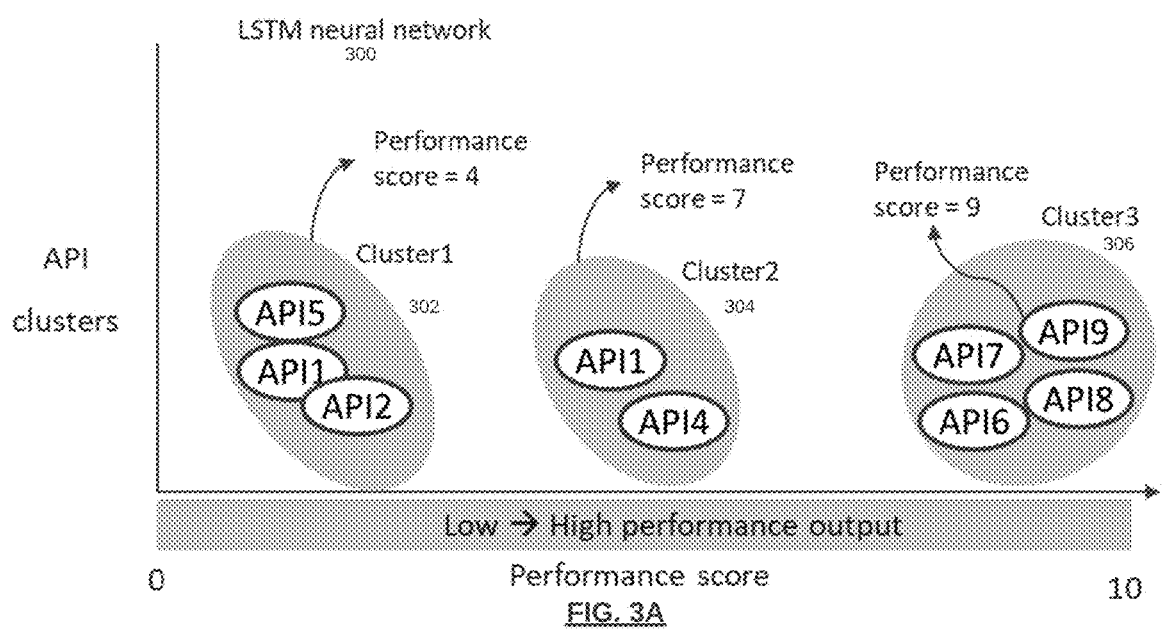

LSTM neural network
300

API clusters

Performance score = 4

Performance score = 7

Performance score = 9

Cluster1 302

Cluster2 304

Cluster3 306

Low → High performance output

0    Performance score    10

FIG. 3A

User Prompt: Eg: Merge "API to extract geolocation of cell phone " and "API to extract Twitter IP address"
306

| | API1 | API2 | API3 | API4 | API5 | API6 | API7 | API8 | API9 | API10 | API11 | API12 | API13 | API14 | API15 | API N | 312 Option | 314 Score |
|---|---|---|---|---|---|---|---|---|---|---|---|---|---|---|---|---|---|---|
| API1 | | | √ | | | | | | | | | | | | √ | √ | 1 | 3 |
| API2 | √ | | | √ | √ | | | | | | | | | | | | 2 | 3 |
| API3 | | √ | | | | | | | | | √ | √ | | | | | 3 | 3 |
| API4 | √ | | | | √ | | √ | | | | | | | | | | 4 | 5 |
| API5 | | | √ | | | | | | | | | √ | | | | √ | 5 | 5 |
| API6 | | √ | √ | √ | | | | | | | | | | | | | 6 | 5 |
| API7 | | | | | | | | | | | | | | | | | 7 | 1 |
| API8 | √ | | | | | | √ | | | | | | | | | | 8 | 1 |
| API9 | | | | √ | √ | | √ | | | | | √ | | √ | √ | | 9 | 1 |
| API10 | | | | √ | √ | | | | | | | | | | √ | | 10 | 1 |
| API11 | | | | √ | | | | | | | | | | | | | 11 | 1 |
| API12 | | | | | √ | √ | | | | | | | | | | | 12 | 1 |
| API13 | | | √ | | | | | √ | | | √ | | | | | | 13 | 10 |
| API14 | | | | √ | √ | | | | | | √ | | | | | | 14 | 9 |
| API15 | | | | | √ | √ | | | | | | | | | | | 15 | 7 |
| API N | | | √ | | | | | √ | √ | | | | √ | | | | N | 8 |

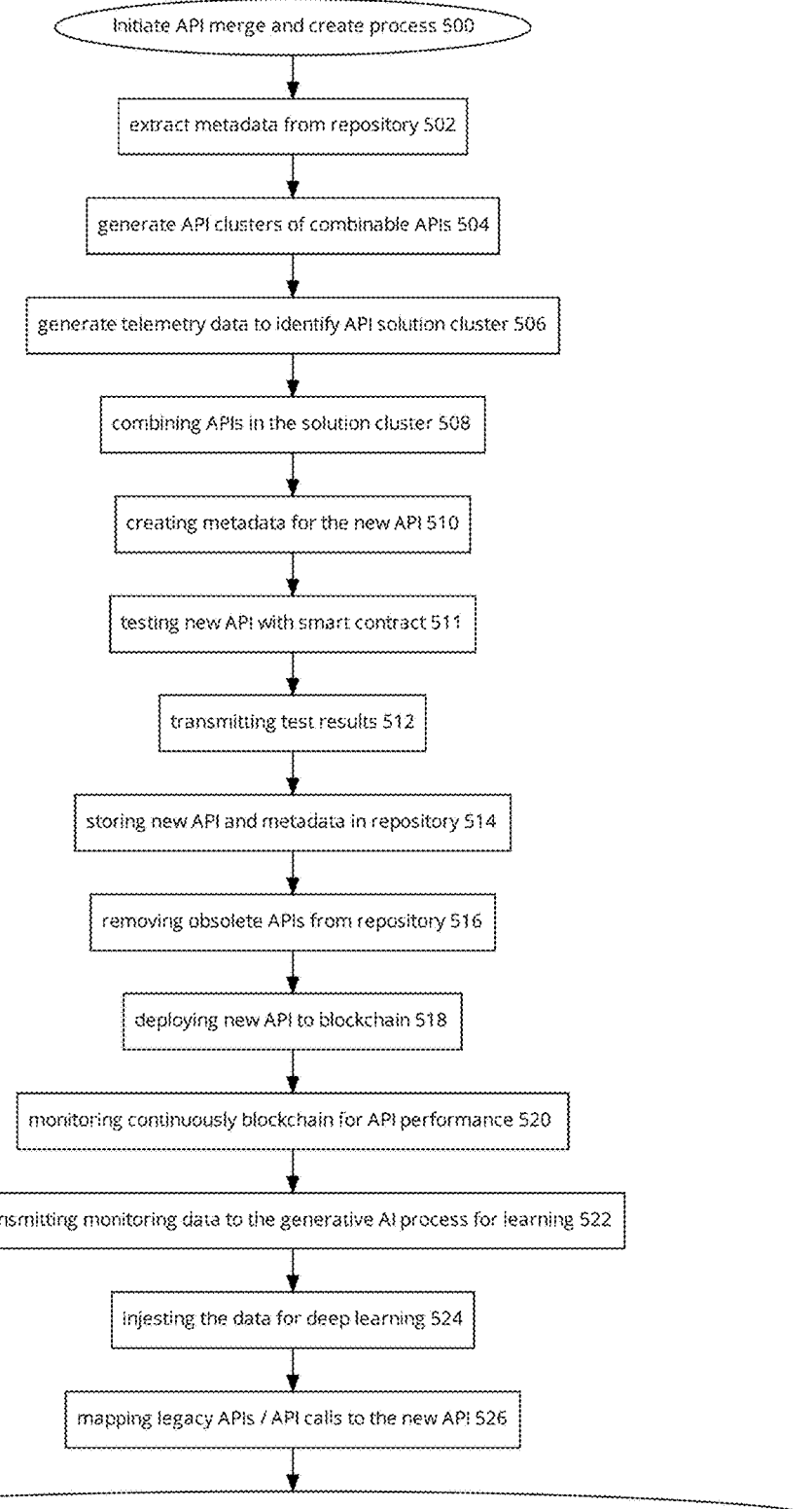

Note: Additional Step Details Provided in Specification for FIGS. 5-7

Initiate API merge and create process 500 extract metadata from repository 502 generate API clusters of combinable APIs 504 generate telemetry data to identify API solution cluster 506 combining APIs in the solution cluster 508 creating metadata for the new API 510 testing new API with smart contract 511 transmitting test results 512 storing new API and metadata in repository 514 removing obsolete APIs from repository 516 deploying new API to blockchain 518 monitoring continuously blockchain for API performance 520 transmitting monitoring data to the generative AI process for learning 522 injesting the data for deep learning 524 mapping legacy APIs / API calls to the new API 526 providing notifications to interested parties or products of API repository changes, new APIs, etc.

FIG. 5

INTELLIGENT METHOD TO MERGE APPLICATION PROGRAMMING INTERFACE (API) LEVERAGING GENERATIVE AI AND PROMPT

TECHNICAL FIELD

The present disclosure relates to electrical computers and digital processing systems with respect to inter-program communication or inter-process communication for an electrical computer or digital data processing system or corresponding data processing method including apparatus or process steps for exchanging data or messages between two executing programs or processes, independent of the hardware used in the communication, and, more particularly, to artificial intelligence analysis and merging of application program interfaces (for sets of routines, procedures, or interfaces that facilitate requests or calls from one or more application programs to lower-level operating system routines) into new and optimized application program interfaces.

DESCRIPTION OF THE RELATED ART

Application programming interfaces simplify software development and innovation by enabling applications to exchange data and functionality easily. An application programming interface (API) is a set of definitions and protocols used for building software applications. An API specifies how software components should interact with each other and how they should request and receive information.

The following are sample components of an API. Data structures define the data that is exchanged between the API and the software component that is using it. Functions define the operations that can be performed on the data. Error handling defines how errors are handled by the API. Documentation provides information about how to use the API, including the data structures, functions, and error handling. In addition to these main components, an API may also include, inter alia, information regarding security, versioning, testing, etc. The security defines how the API is protected from unauthorized access. The versioning defines how different versions of the API are compatible with each other. The testing defines how the API is tested to ensure that it is working correctly.

As an example of how they are used, APIs can sit between an application and a web server, acting as an intermediary layer that processes data transfer between systems. Significant development effort is required to build an API, and many new and legacy software applications may come to rely on the API for proper functionality. New APIs are created by developers constantly for new programs and updates to existing software.

Oftentimes, multiple APIs are necessary for application execution and are frequently called by software applications. Newer APIs may include the functionality provided by older APIs as well as additional functionality. As such, calling multiple legacy APIs as opposed to a new API or a combination of other APIs may result in suboptimal performance. Similarly, it difficult to manage, store, and keep track of an ever-increasing number of APIs in databases or data stores, especially when legacy APIs should be retired in view of more optimal functionality provided in new APIs or combinations thereof. Further, there is no current method to constantly analyze existing APIs to determine optimal combinations thereof that can be merged and to retire non-optimal APIs. In addition, there is no current method of mapping discontinued legacy API calls to newly merged and optimized APIs. And there is no method of updating and optimizing API repositories.

Hence, there is a long felt and unsatisfied need to, inter alia, intelligently merge a plurality of APIs on-demand by user requirement prompt(s), or as automatically detected by artificial intelligence (AI), based on generative AI analysis on extracted metadata to identify optimum combinations for one or more new APIs to replace legacy APIs, to map legacy calls to new API functionality, to utilize smart contracts to test newly generated APIs and deploy them in desired environments based on blockchain consent protocols for management thereof.

SUMMARY OF THE INVENTION

In accordance with one or more arrangements of the non-limiting sample disclosures contained herein, solutions are provided to address one or more of the shortcomings in the field of APIs by, inter alia, (a) using an intelligent technical process to merge two or more APIs leveraging generative AI based on user prompt requirements and/or system optimization (e.g., periodic or on-demand triggers); (b) extracting, from repositories, API metadata such as API names endpoints, request/response formats (e.g., JSON or XLM), authentication mechanisms (e.g., API keys, OAuth, or JWT tokens), rate limits, error codes, error messages, version scheme(s), API documentation, etc.; (c) utilizing extracted API metadata to formulate and generate new API(s) based on user requirement prompts and/or AI analysis of existing APIs/API repositories; (d) using generative AI deep learning algorithms (including abstract syntax tree (AST), generative pre-trained transformer (GPT), natural language processing, etc.) to analyze, merge, and construct new APIs based on user, software, and/or optimization requirements; (e) leverage smart contracts to test newly generated APIs and deploy them in desired environments based on blockchain consent protocols to manage APIs and provide notifications of the same; (f) identifying APIs whose functionalities can and/or need to be merged to construct one API based on clustering; (g) selecting optimum newly generated API based on API combination performance analysis; (h) deploying generated APIs based on maximum performance output, security requirements, and/or other indicators, criteria, or requirements; (i) providing interface layers to map legacy API calls to newly created and now current APIs and API functionality; (j) optimizing API repositories and deprecating obsolete or legacy APIs, identifying and removing redundant APIs, identifying and removing security vulnerable APIs, etc.; and/or (k) providing a no-code system where no code or less code is required and the system can create an API call for whatever the user is requesting or whatever a system automatically determines is more optimal.

Sample primary components of one or more of the foregoing may include, for example, one or more of: user prompt modules, API metadata extraction modules, API analyzer modules, API generation modules, API smart-contract testing modules, API deployment orchestration modules, and/or API monitoring modules, etc. These may interact with or have included therein security components and rules as well as deep learning functionality.

Samples of API metadata include, but are not limited to: Name: The name of the API. Description: A brief description of the API. Version: The version of the API. Endpoints: The endpoints of the API, which are the URLs that can be used to access the API. Parameters: The parameters that can be passed to the API endpoints. Responses: The responses that can be returned by the API endpoints. Errors: The errors that can be returned by the API endpoints. Documentation: The documentation for the API, which provides more detailed information about how to use the API. Security: The security requirements for the API, such as which authentication methods are supported. Versioning: The versioning scheme for the API, which describes how different versions of the API are compatible with each other. Testing: The testing requirements for the API, which describes how the API should be tested to ensure that it is working correctly. Rate limits: The rate limits for the API, which specify how many requests can be made to the API in a given period of time. Caching: The caching requirements for the API, which describe how the API responses can be cached to improve performance. Tracing: The tracing requirements for the API, which describe how the API requests and responses can be traced to troubleshoot problems. Logging: The logging requirements for the API, which describe how the API requests and responses can be logged for auditing purposes.

Considering the foregoing, the following presents a simplified summary of the present disclosure to provide a basic understanding of various aspects of the disclosure. This summary is not limiting with respect to the exemplary aspects of the inventions described herein and is not an extensive overview of the disclosure. It is not intended to identify key or critical elements of or steps in the disclosure or to delineate the scope of the disclosure. Nor is it intended to imply or require that any such steps or elements be implemented or executed in any particular order. Instead, as would be understood by a personal of ordinary skill in the art, the following summary merely presents some concepts of the disclosure in a simplified form as a prelude to the more detailed description provided below. Moreover, sufficient written descriptions of the inventions are disclosed in the specification throughout this application along with exemplary, non-exhaustive, and non-limiting manners and processes of making and using the inventions, in such full, clear, concise, and exact terms to enable skilled artisans to make and use the inventions without undue experimentation and sets forth the best mode contemplated for carrying out the inventions.

In some arrangements, an artificial-intelligence merger, construction, and optimization method for application program interfaces can comprise one or more steps such as, for example: initiating, based on receipt by a prompt module, one of a user-request requirement and a repository-optimization trigger, an application program interface (API) merge and create process to merge mergeable APIs stored in a distributed API repository into a constructed API that is newly created and to remove obsolete APIs from the distributed API repository based on the mergeable APIs that were merged; extracting, by a metadata extraction module, API metadata for the mergeable APIs from the distributed API repository; generating, by an analyzer module based on a generative artificial intelligence (AI) process executing deep-learning abstract syntax tree (AST) and generative pre-trained transformer (GPT) algorithms, API clusters containing combinable APIs from the mergeable APIs based on the API metadata that was extracted; generating, by the API analyzer using the generative AI process, telemetry for the API clusters to identify an API solution cluster for the combinable APIs based on which of the API clusters had a highest performance ranking in view of execution speed, predicted reliability, security, and scalability; combining, by a generation module consistent with API security-rule requirements, the combinable APIs identified by the API solution cluster into the constructed API; creating, by the generation module, constructed metadata for the constructed API; testing, by a smart contract module, the constructed API as a smart contract to obtain operability test results on the constructed API, said smart contract being a self-executing contract with agreement terms for software API testing written into code for the smart contract, said smart contract stored on a distributed ledger blockchain; transmitting, by the smart contract module to the generative AI process, the operability test results based on execution of the smart contract with respect to the constructed API; storing, in the distributed API repository, the constructed API with the constructed metadata; removing, from the distributed API repository, any of said combinable APIs and any of said API metadata that is obsolete in view of the constructed API; deploying, by an orchestration module, the constructed API to the distributed ledger blockchain; monitoring, continuously by an API monitoring module, the distributed ledger blockchain to observe performance metrics for the constructed API; transmitting, by the API monitoring module to the generative AI process, the performance metrics; ingesting, into the generative AI process, the operability test results and the performance metrics; mapping, to the constructed API in the distributed API repository, future process calls to any of said combinable APIs that were rendered obsolete; and/or providing, by the API merge and create process, developer notifications for any of said combinable APIs that were rendered obsolete.

In some arrangements, an artificial-intelligence merger, construction, and optimization method for application program interfaces can comprise one or more steps such as, for example: initiating, based on either a user request or a repository-optimization trigger, an application program interface (API) merge and create process to merge mergeable APIs stored in an API repository into a constructed API that is newly created and to remove obsolete APIs from the API repository based on the mergeable APIs that were merged; extracting, by a metadata extraction module, API metadata for the mergeable APIs from the API repository; generating, by an analyzer module based on a generative artificial intelligence (AI) process executing one or more deep-learning algorithms, API clusters containing combinable APIs from the mergeable APIs based on the API metadata that was extracted; generating, by the API analyzer using the generative AI process, telemetry for the API clusters to identify an API solution cluster for the combinable APIs; combining, by a generation module consistent with API security-rule requirements, the combinable APIs identified by the API solution cluster into the constructed API; creating, by the generation module, constructed metadata for the constructed API; testing, by a smart contract module, the constructed API as a smart contract to obtain operability test results; transmitting, by the smart contract module to the generative AI process, the operability test results based on execution of the smart contract with respect to the constructed API; storing, in the API repository, the constructed API with the constructed metadata; removing, from the API repository, any of said combinable APIs and any of said API metadata that is obsolete in view of the constructed API; and/or deploying, by an orchestration module, the constructed API to the distributed ledger blockchain.

In some arrangements, the API merge and create process is initiated based on a user-request with user-specified requirements for a desired API.

In some arrangements, the API merge and create process is initiated based on an instruction to optimize the APIs in the API repository. The instruction can be sent manually. Alternatively, the process may be run at scheduled intervals or executed based on other system triggers.

In some arrangements, deep-learning algorithms that are utilized by the generative AI process may include a generative pre-trained transformer (GPT) algorithm.

In some arrangements, deep-learning algorithms that are utilized by the generative AI process may include an abstract syntax tree (AST) algorithm.

In some arrangements, an artificial-intelligence merger, construction, and optimization method for application program interfaces can comprise one or more steps such as, for example: extracting, by a metadata extraction module, application program interface (API) metadata from a distributed API repository; analyzing, by an analyzer module using a generative artificial intelligence (AI) process with deep learning, the API metadata to generate API clusters containing combinable APIs; generating, by the API analyzer using the generative AI process, telemetry for the API clusters to identify an API solution cluster for the combinable APIs based on highest performance; combining, by a generation module consistent with API security rules, the combinable APIs identified by the API solution cluster into a merged API with merged metadata; testing, by a smart contract module, the merged API as a smart contract to obtain operability test results; transmitting, by the smart contract module to the generative AI process, the operability test results; storing, in the distributed API repository, the merged API with merged metadata therefor; removing, from the distributed API repository, any of said combinable APIs and any of said API metadata that are obsolete in view of the merged API; deploying, by an orchestration module, the merged API to a distributed ledger blockchain; monitoring, by an API monitoring module, the distributed ledger blockchain to observe performance metrics for the merged APIs; transmitting, by the API monitoring module to the generative AI process, the performance metrics; and/or incorporating, into the generative AI process using the deep learning, the operability test results and the performance metrics.

In some arrangements, one or more various steps or processes disclosed herein can be implemented in whole or in part as computer-executable instructions (or as computer modules or in other computer constructs) stored on computer-readable media. Functionality and steps can be performed on a machine or distributed across a plurality of machines that are in communication with one another.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

BRIEF DESCRIPTION OF DRAWINGS

FIG. 1 depicts a sample, functional, flow diagram conceptually showing sample interactions, steps, functions, and components to allow user requirements to be entered into a prompt and then for applicable APIs in a repository to be merged in accordance with one or more aspects of this disclosure.

FIGS. 2A-2B and 3A-3B depict sample, functional, flow functionality and API metadata for clustering, comparing, scoring, and selection of potential API combinations with respect to API analysis in accordance with one or more API merger aspects of this disclosure.

FIGS. 5-7 depict sample, functional, flow diagrams showing sample interactions, steps, functions, and components for artificial-intelligence merger, construction, and optimization methods for application program interfaces in accordance with one or more aspects of this disclosure.

DETAILED DESCRIPTION

Figure 4:
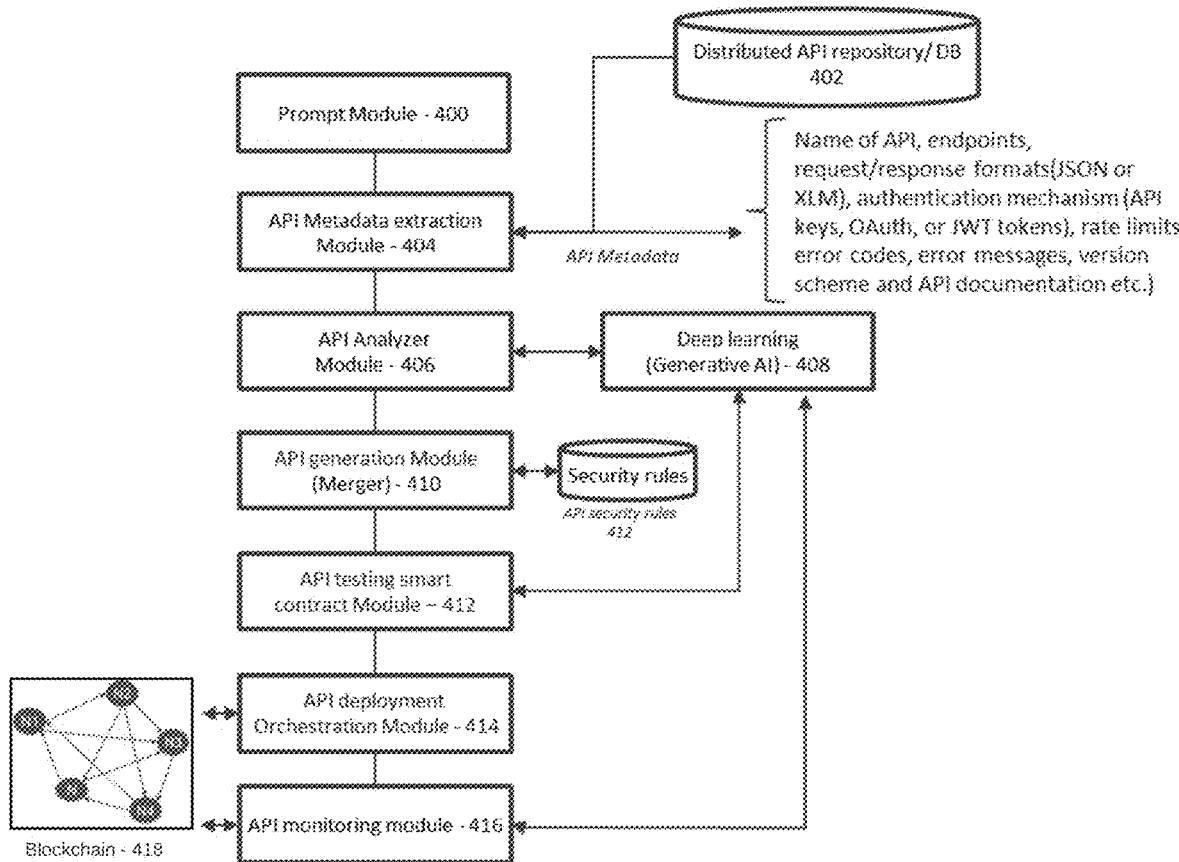
FIG. 4 depicts a sample, functional, architectural-block diagram showing sample interactions, steps, functions, and components for providing user API requirements, extracting API metadata, analyzing APIs, generating and testing API options, API deployment, and API monitoring in accordance with one or more artificial-intelligence based API-merger aspects of this disclosure.

In the following description of the various embodiments to accomplish the foregoing, reference is made to the accompanying drawings, which form a part hereof, and in which is shown by way of illustration, various embodiments in which the disclosure may be practiced. It is to be understood that other embodiments may be utilized, and structural and functional modifications may be made. It is noted that various connections between elements are discussed in the following description. It is noted that these connections are general and, unless specified otherwise, may be direct or indirect, wired, or wireless, and that the specification is not intended to be limiting in this respect.

As used throughout this disclosure, any number of computers, machines, or the like can include one or more general-purpose, customized, configured, special-purpose, virtual, physical, and/or network-accessible devices such as: administrative computers, application servers, clients, cloud devices, clusters, compliance watchers, computing devices, computing platforms, controlled computers, controlling computers, desktop computers, distributed systems, enterprise computers, instances, laptop devices, monitors or monitoring systems, nodes, notebook computers, personal computers, portable electronic devices, portals (internal or external), servers, smart devices, streaming servers, tablets, web servers, and/or workstations, which may have one or more application specific integrated circuits (ASICs), microprocessors, cores, executors etc. for executing, accessing, controlling, implementing etc. various software, computer-executable instructions, data, modules, processes, routines, or the like as discussed below.

References to computers, machines, or the like as in the examples above are used interchangeably in this specification and are not considered limiting or exclusive to any type(s) of electrical device(s), or component(s), or the like. Instead, references in this disclosure to computers, machines, or the like are to be interpreted broadly as understood by skilled artisans. Further, as used in this specification, computers, machines, or the like also include all hardware and components typically contained therein such as, for example, ASICs, processors, executors, cores, etc., display(s) and/or input interfaces/devices, network interfaces, communication buses, or the like, and memories or the like, which can include various sectors, locations, structures, or other electrical elements or components, software, computer-executable instructions, data, modules, processes, routines etc. Other specific or general components, machines, or the like are not depicted in the interest of brevity and would be understood readily by a person of skill in the art.

As used throughout this disclosure, software, computer-executable instructions, data, modules, processes, routines, or the like can include one or more: active-learning, algorithms, alarms, alerts, applications, application program interfaces (APIs), artificial intelligence, approvals, asymmetric encryption (including public/private keys), attachments, big data, blockchains, blocks, CRON functionality, daemons, databases, datasets, datastores, DeFi functionality, drivers, data structures, deep learning modules (e.g., knowledge graphs, NLP, LSTM, GAN, etc.), distributed ledgers, distributed-ledger blockchains, dynamic rule engines, emails, extraction functionality, file systems or distributed file systems, firmware, governance rules, graphical user interfaces (GUI or UI), images, instructions, interactions, Java jar files, Java Virtual Machines (JVMs), juggler schedulers and supervisors, load balancers, load functionality, machine learning (supervised, semi-supervised, unsupervised, or natural language processing), metadata, middleware, modules, namespaces, objects, operating systems, optimization modules, platforms, processes, protocols, programs, rejections, routes, routines, rule deployment modules, security, scripts, tables, tools, transactions, transformation functionality, user actions, user interface codes, utilities, web application firewalls (WAFs), web servers, web sites, etc.

The foregoing software, computer-executable instructions, data, modules, processes, routines, or the like can be on tangible computer-readable memory (local, in network-attached storage, be directly and/or indirectly accessible by network, removable, remote, cloud-based, cloud-accessible, etc.), can be stored in volatile or non-volatile memory, and can operate autonomously, on-demand, on a schedule, spontaneously, proactively, and/or reactively, and can be stored together or distributed across computers, machines, or the like (e.g., in a decentralized network that may include a consortium of networks, entities, institutions, etc.) including memory and other components thereof. Some or all the foregoing may additionally and/or alternatively be stored similarly and/or in a distributed manner in the network accessible storage/distributed data/datastores/databases/big data/blockchains/distributed ledger blockchains etc.

As used throughout this disclosure, computer "networks," topologies, or the like can include one or more local area networks (LANs), wide area networks (WANs), the Internet, clouds, wired networks, wireless networks, digital subscriber line (DSL) networks, frame relay networks, asynchronous transfer mode (ATM) networks, virtual private networks (VPN), or any direct or indirect combinations of the same. They may also have separate interfaces for internal network communications, external network communications, and management communications. Virtual IP addresses (VIPs) may be coupled to each if desired. Networks also include associated equipment and components such as access points, adapters, buses, ethernet adaptors (physical and wireless), firewalls, hubs, modems, routers, and/or switches located inside the network, on its periphery, and/or elsewhere, and software, computer-executable instructions, data, modules, processes, routines, or the like executing on the foregoing. Network(s) may utilize any transport that supports HTTPS or any other type of suitable communication, transmission, and/or other packet-based protocol.

By way of non-limiting disclosure, FIG. 1 depicts a sample, functional, flow diagram conceptually showing sample interactions, steps, functions, and components to allow user requirements to be entered into a prompt and then for applicable APIs in a repository to be merged in accordance with one or more aspects of this disclosure.

The artificial intelligence (AI) merger process can include various system components 100 such as, for example, prompt module 102, API metadata extraction module 104, API analyzer module 106, API generation module 108, API testing smart contract module 110, API deployment orchestration module 112, and/or API monitoring module 114.

A user may be presented with a user prompt interface 116 that allows a user to enter requirements for combining APIs, optimizing APIs, and/or creating a brand-new API.

The user can prompt the system to merge two or more APIs. After a user enters the requirements in the prompt, one or more repositories that are consolidated or distributed such as distributed API repository 118 are accessed. The depository 118 can include complete APIs or be limited to metadata for APIs in which case reference to where the API code is located could be made for use by the AI merge process. The metadata for the APIs can then be extracted for analysis. Metadata for applicable APIs can be extracted for those APIs that correspond to the user requirements. Only metadata for the APIs to be evaluated need be extracted.

As an example, a user may generally enter into a prompt a request for an API that is able to extract geolocations of cellphones that are twitting 124. Or the user may specifically state that the API to extract geolocation of cell phone 120 should be merged with the API to extract a Twitter IP address 122. Either way, the user enters the requirement or request in UI interface 116. The distributed API repository 118 or the like is accessed. Applicable APIs are identified and metadata for those applicable APIs is then analyzed for combinability, functionality, performance, and security. The result is identification of potential API combination options that can provide the functionality of extracting cellphone geolocations during twitting.

By way of non-limiting disclosure, FIGS. 2A-2B and 3A-3B depict sample, functional, flow functionality and API metadata for clustering, comparing, scoring, and selection of potential API combinations with respect to API analysis in accordance with one or more API merger aspects of this disclosure.

In FIG. 2A, an LSTM neural network 200 or the like can be utilized by an API monitoring module 202 to provide API ratings 204 for possible API merger combinations. Sample criteria 208 considered for the API rating 206 can include, for example, response time, latency, throughput (e.g., number of requests that an API can handle within a specific time frame), error rate, availability, scalability including the number of potential concurrent users, cache hit rate, API call rate, time to first byte (TTFB), and/or success rate.

FIG. 2B illustrates the process from a high-level overview perspective. In 250, the method intelligently selects APIs whose functionalities need to be merged to construct one API based on clustering. Selection of such API is based on API performance analysis clustering. API metadata is extracted in 252. Performance telemetry is identified in 254. Clustering of API combinations is performed based on desired parameters (e.g., speed, security, or other criteria metrics, etc.) in 258. Merger may be initiated and the API may be generated in 258.

As shown in FIG. 3A, LSTM neural network 300 or other AI analysis may evaluate the various API combination options and score them. In this example, API clusters are graphed versus performance output scores. The first cluster combination 302 may include API-1, API-2, and API-5, which may have been analyzed to have a performance score of 4. Similarly, the second cluster combination 304 may include API-1 and API-4 that can also provide the same functionality, but this combination may have a higher performance score of 7. The third cluster combination 306 may include API-6, API-7, API-8, and API-9, which may have an even higher optimized performance and score of 9. Using this approach, the AI model may identify the optimal combination of APIs and proceed accordingly. The performance score could be based on any desired actual or predicted criteria, or combination thereof, including, but not limited to, execution speed, error rate, security, operability, scalability, availability, latency, throughput, cache hit rate, API call rate, time to first byte, success rate, etc.

FIG. 3B illustrates the results of this type of AI generative deep learning analysis wherein each permutation option 312 is analyzed and assigned a score 314 that is based on one or more desired criteria. In this manner, the ideal combination may be identified as a proposed solution cluster of APIs to merge or combine. In this example, the horizontal and vertical table headers identify each API. Checkmarks inside the table corresponding to the horizontal rows and vertical columns indicate which APIs are included in which permutation options. The process is repeated in order to include all of the possible API combinations that, based on their extracted metadata, may provide the functionality requested by the user or required for system optimization.

By way of non-limiting disclosure, FIG. 4 depicts a sample, functional, architectural-block diagram showing sample interactions, steps, functions, and components for providing user API requirements, extracting API metadata, analyzing APIs, generating and testing API options, API deployment, and API monitoring in accordance with one or more artificial-intelligence based API-merger aspects of this disclosure.

A prompt module 400 provides a user with a UI, prompt, search bar, drop down list, scheduler, button selectable APIs or other opportunity to enter an API generation request, merge request, system instruction (scheduled or with button for immediate on-demand execution) to perform repository optimization, etc. Some examples are illustrated in FIG. 1 in the generative AI user interface prompts/system optimization/settings 116. Requirements from the request can be extracted based on natural language processing, AI, specific identification of APIs, other indicators, deep learning, etc.

Based on the requirements from the prompt module 400 or identified or provided by other means, a distributed (or non-distributed) API repository 402 is accessed. The repository may be local or remote, consolidated or distributed, and may comprise one or more deposits since the number of APIs and storage/processing requirements may be large.

Applicable APIs are identified in the repository 402 in order to match the requirements. API metadata extraction module 404 then extracts the applicable metadata corresponding to the request from the repository 402. Extracted metadata may be retained in a cache and refreshed as needed as new APIs are generated, old APIs are deprecated, etc. Alternatively, all metadata may be extracted on-demand upon each fresh request.

The API metadata may include, for example, any of: API names, endpoints (i.e. URLs that can be used to access the API), the parameters that can be passed to the API endpoints, request/response formats (e.g., JSON or XLM), authentication mechanism (API keys, OAuth, or JWT tokens), error codes and messages for the errors that can be returned by the API endpoints, documentation for the API, security requirements for the API (e.g., which authentication methods are supported), the versioning scheme for the API, the testing requirements for the API that describe how the API should be tested to ensure that it is working correctly, the rate limits for the API that specify how many requests can be made to the API in a given period of time, caching requirements for the API that describe how the API responses can be cached to improve performance, the tracing requirements for the API that describe how the API requests and responses can be traced to troubleshoot problems, the logging requirements for the API that describe how the API requests and responses can be logged for auditing purposes, etc. Some or all of the foregoing may be extracted from repository 402 for analysis purposes and passed to API analyzer 406.

API analyzer module 406 proceeds to analyze the extracted API metadata using deep learning generative AI 408. This can take the form of abstract syntax tree (AST) and advanced deep learning generative AI algorithms such as generative pre-trained transformer (GPT) (including natural language processing), a knowledge graph model, LSTM neural network model, a generative adversarial network (GAN) model, or other desired deep learning model.

Based on the APIs in the solution cluster identified by the API analyzer module 406, an API generation module 410 proceeds to merge APIs in the solution cluster. This merging can be performed in accordance with API security rules 412.

The generated API (i.e., merged API or otherwise created API) can then be tested by API testing smart-contract module 412. In the context of this disclosure, a smart contract is considered to be a self-executing contract that is stored in a blockchain. It can be used to automate the execution of an agreement between two or more parties. Smart contracts can be used to test software in a number of ways, including: Functional testing: This type of testing ensures that the smart contract performs its intended function correctly. For example, you could test a smart contract that is supposed to transfer money from one account to another by sending different amounts of money and checking that the correct amount is transferred each time. Security testing: This type of testing ensures that the smart contract is secure from attack. For example, you could test a smart contract for vulnerabilities such as reentrancy attacks or front-running attacks. Performance testing: This type of testing ensures that the smart contract can handle a high volume of transactions without slowing down or crashing. For example, you could test a smart contract by sending a large number of transactions to it and checking that it can process them all in a timely manner.

Assuming that the newly created API tests successful with the smart contract module 412, an API deployment orchestration module 418 can publish the new API to a distributed ledger blockchain 418 or other network. Other blockchains for other APIs that are obsolete, have been modified, etc. can be updated as well. Notifications for blockchain changes and for new APIs, deprecated APIs, or obsolete APIs can be provided as well.

After deployment, an API monitoring module 416 can monitor the blockchain for performance, error rates, and other criteria or information regarding the API. This can be performed continuously, periodically, or on demand. Feedback regarding the monitoring can be provided to the deep learning generative AI 408 so that the model/module may learn from ongoing activities. Based on what is learned, additional modifications to the API repository/DB or other structure may be made as necessary.

Figure 6:
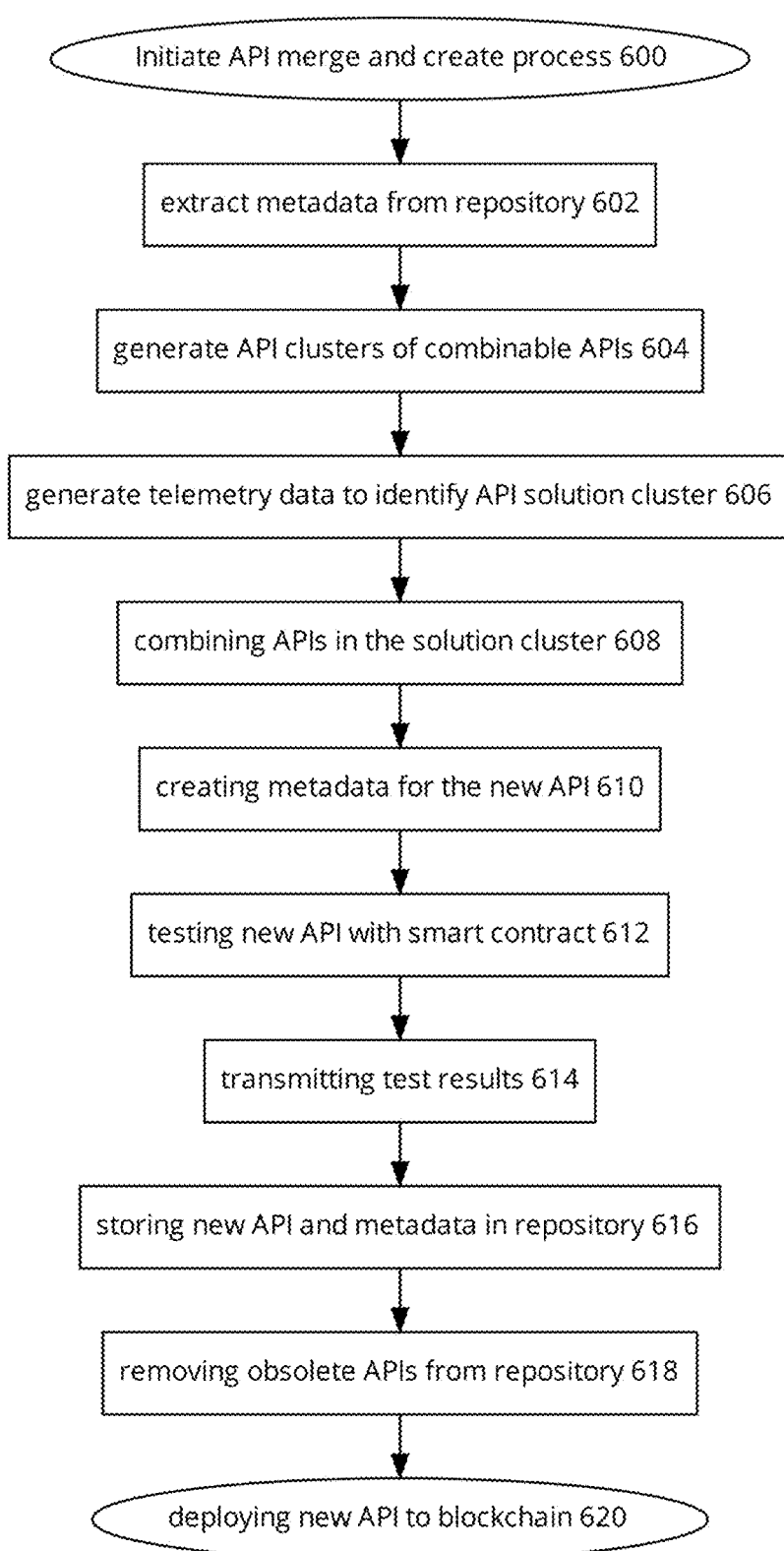
Figure 7:
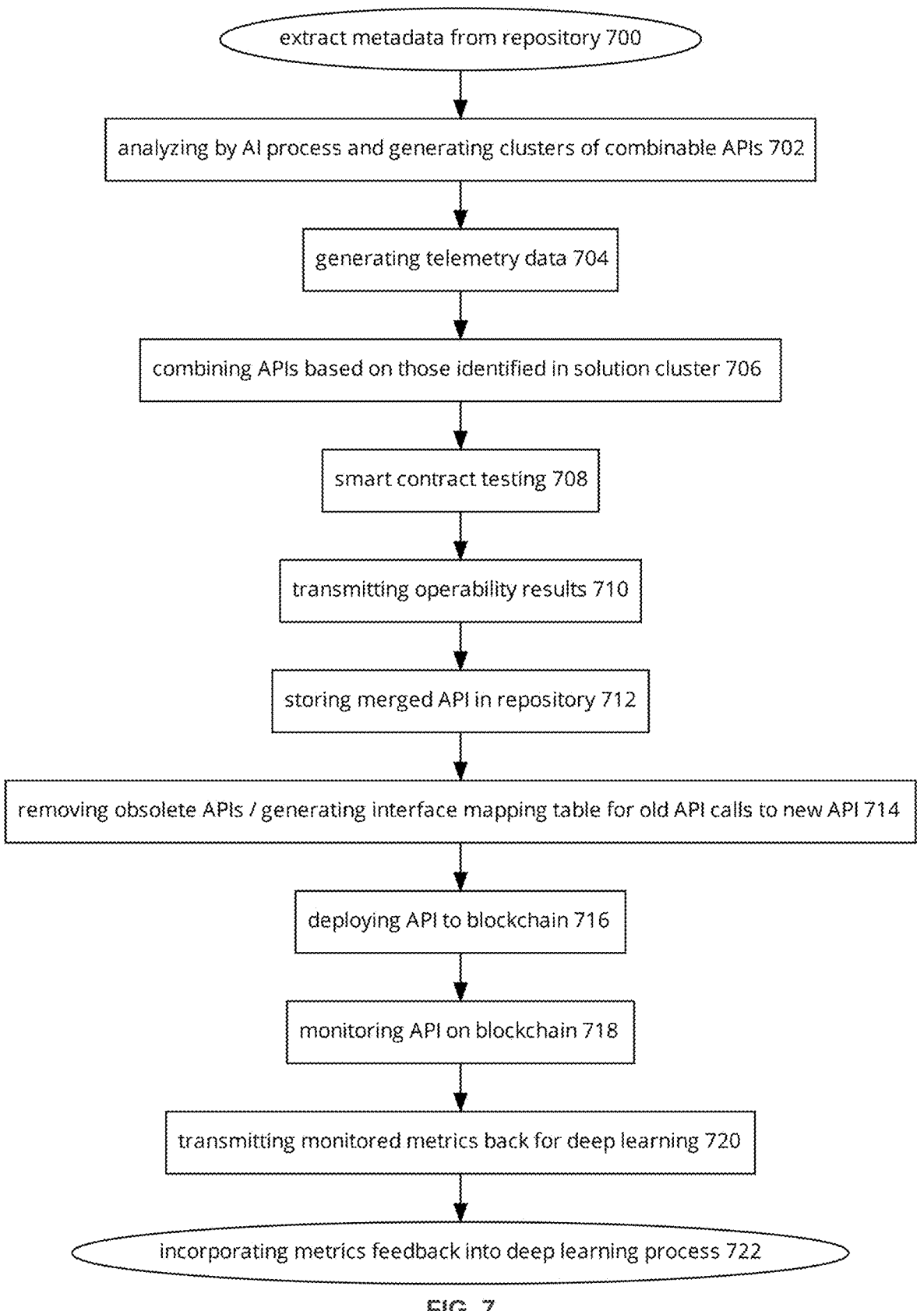

FIGS. 5-7 depict sample, functional, flow diagrams showing sample interactions, steps, functions, and components for artificial-intelligence merger, construction, and optimization methods for application program interfaces in accordance with one or more aspects of this disclosure.

Referring to FIG. 5, an artificial-intelligence merger, construction, and optimization method for application program interfaces can comprise one or more steps such as, for example: initiating, based on receipt by a prompt module, one of a user-request requirement and a repository-optimization trigger, an application program interface (API) merge and create process to merge mergeable APIs stored in a distributed API repository into a constructed API that is newly created and to remove obsolete APIs from the distributed API repository based on the mergeable APIs that were merged 500; extracting, by a metadata extraction module, API metadata for the mergeable APIs from the distributed API repository 502; generating, by an analyzer module based on a generative artificial intelligence (AI) process executing deep-learning abstract syntax tree (AST) and generative pre-trained transformer (GPT) algorithms, API clusters containing combinable APIs from the mergeable APIs based on the API metadata that was extracted 504; generating, by the API analyzer using the generative AI process, telemetry for the API clusters to identify an API solution cluster for the combinable APIs based on which of the API clusters had a highest performance ranking in view of execution speed, predicted reliability, security, and scalability 506; combining, by a generation module consistent with API security-rule requirements, the combinable APIs identified by the API solution cluster into the constructed API 508; creating, by the generation module, constructed metadata for the constructed API 510; testing, by a smart contract module, the constructed API as a smart contract to obtain operability test results on the constructed API, said smart contract being a self-executing contract with agreement terms for software API testing written into code for the smart contract, said smart contract stored on a distributed ledger blockchain 511; transmitting, by the smart contract module to the generative AI process, the operability test results based on execution of the smart contract with respect to the constructed API 512; storing, in the distributed API repository, the constructed API with the constructed metadata 514; removing, from the distributed API repository, any of said combinable APIs and any of said API metadata that is obsolete in view of the constructed API 516; deploying, by an orchestration module, the constructed API to the distributed ledger blockchain 518; monitoring, continuously by an API monitoring module, the distributed ledger blockchain to observe performance metrics for the constructed API 520; transmitting, by the API monitoring module to the generative AI process, the performance metrics 522; ingesting, into the generative AI process, the operability test results and the performance metrics 524; mapping, to the constructed API in the distributed API repository, future process calls to any of said combinable APIs that were rendered obsolete 526; and/or providing, by the API merge and create process, developer notifications for any of said combinable APIs that were rendered obsolete 528.

Referring to FIG. 6, an artificial-intelligence merger, construction, and optimization method for application program interfaces can comprise one or more steps such as, for example: initiating, based on either a user request or a repository-optimization trigger, an application program interface (API) merge and create process to merge mergeable APIs stored in an API repository into a constructed API that is newly created and to remove obsolete APIs from the API repository based on the mergeable APIs that were merged 600; extracting, by a metadata extraction module, API metadata for the mergeable APIs from the API repository 602; generating, by an analyzer module based on a generative artificial intelligence (AI) process executing one or more deep-learning algorithms, API clusters containing combinable APIs from the mergeable APIs based on the API metadata that was extracted 604; generating, by the API analyzer using the generative AI process, telemetry for the API clusters to identify an API solution cluster for the combinable APIs 606; combining, by a generation module consistent with API security-rule requirements, the combinable APIs identified by the API solution cluster into the constructed API 608; creating, by the generation module, constructed metadata for the constructed API 610; testing, by a smart contract module, the constructed API as a smart contract to obtain operability test results 612; transmitting, by the smart contract module to the generative AI process, the operability test results based on execution of the smart contract with respect to the constructed API 614; storing, in the API repository, the constructed API with the constructed metadata 616; removing, from the API repository, any of said combinable APIs and any of said API metadata that is obsolete in view of the constructed API 618; and/or deploying, by an orchestration module, the constructed API to the distributed ledger blockchain 620.

Referring to FIG. 7, an artificial-intelligence merger, construction, and optimization method for application program interfaces can comprise one or more steps such as, for example: extracting, by a metadata extraction module, application program interface (API) metadata from a distributed API repository 700; analyzing, by an analyzer module using a generative artificial intelligence (AI) process with deep learning, the API metadata to generate API clusters containing combinable APIs 702; generating, by the API analyzer using the generative AI process, telemetry for the API clusters to identify an API solution cluster for the combinable APIs based on highest performance 704; combining, by a generation module consistent with API security rules, the combinable APIs identified by the API solution cluster into a merged API with merged metadata 706; testing, by a smart contract module, the merged API as a smart contract to obtain operability test results 708; transmitting, by the smart contract module to the generative AI process, the operability test results 710; storing, in the distributed API repository, the merged API with merged metadata therefor 712; removing, from the distributed API repository, any of said combinable APIs and any of said API metadata that are obsolete in view of the merged API 714; deploying, by an orchestration module, the merged API to a distributed ledger blockchain 716; monitoring, by an API monitoring module, the distributed ledger blockchain to observe performance metrics for the merged APIs 718; transmitting, by the API monitoring module to the generative AI process, the performance metrics 720; and/or incorporating, into the generative AI process using the deep learning, the operability test results and the performance metrics 722.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

The invention claimed is:

1. An artificial-intelligence merger, construction, and optimization method for application program interfaces comprising the steps of:

initiating, based on receipt by a prompt module, one of a user-request requirement and a repository-optimization trigger, an application program interface (API) merge and create process to merge mergeable APIs stored in a distributed API repository into a constructed API that is newly created and to remove obsolete APIs from the distributed API repository based on the mergeable APIs that were merged;

extracting, by a metadata extraction module, API metadata for the mergeable APIs from the distributed API repository;

generating, by an API analyzer module based on a generative artificial intelligence (AI) process executing deep-learning abstract syntax tree (AST) and generative pre-trained transformer (GPT) algorithms, API clusters containing combinable APIs from the mergeable APIs based on the API metadata that was extracted;

generating, by the API analyzer module using the generative AI process, telemetry for the API clusters to identify an API solution cluster for the combinable APIs based on which of the API clusters had a highest performance ranking in view of execution speed, predicted reliability, security, and scalability;

combining, by a generation module consistent with API security-rule requirements, the combinable APIs identified by the API solution cluster into the constructed API;

creating, by the generation module, constructed metadata for the constructed API;

testing, by a smart contract module, the constructed API as a smart contract to obtain operability test results on the constructed API, said smart contract being a self-executing contract with agreement terms for software API testing written into code for the smart contract, said smart contract stored on a distributed ledger blockchain;

transmitting, by the smart contract module to the generative AI process, the operability test results based on execution of the smart contract with respect to the constructed API;

storing, in the distributed API repository, the constructed API with the constructed metadata;

removing, from the distributed API repository, any of said combinable APIs and any of said API metadata that is obsolete in view of the constructed API;

deploying, by an orchestration module, the constructed API to the distributed ledger blockchain;

monitoring in real-time, by an API monitoring module, the distributed ledger blockchain to observe continuously performance metrics for the constructed API;

transmitting, by the API monitoring module, to the generative AI process, the performance metrics;

ingesting, into the generative AI process, the operability test results and the performance metrics;

mapping, to the constructed API in the distributed API repository, future process calls to any of said combinable APIs that were rendered obsolete; and providing, by the API merge and create process, developer notifications for any of said combinable APIs that were rendered obsolete.

2. An artificial-intelligence merger, construction, and optimization method for application program interfaces comprising the steps of:

initiating, based on either a user request or a repository-optimization trigger, an application program interface (API) merge and create process to merge mergeable APIs stored in an API repository into a constructed API that is newly created and to remove obsolete APIs from the API repository based on the mergeable APIs that were merged;

extracting, by a metadata extraction module, API metadata for the mergeable APIs from the API repository;

generating, by an API analyzer module based on a generative artificial intelligence (AI) process executing one or more deep-learning algorithms, API clusters containing combinable APIs from the mergeable APIs based on the API metadata that was extracted;

generating, by the API analyzer module using the generative AI process, telemetry for the API clusters to identify an API solution cluster for the combinable APIs based on which of the API clusters had a highest performance ranking in view of execution speed, predicted reliability, security, and scalability;

combining, by a generation module consistent with API security-rule requirements, the combinable APIs identified by the API solution cluster into the constructed API;

creating, by the generation module, constructed metadata for the constructed API;

testing, by a smart contract module, the constructed API as a smart contract to obtain operability test results on the constructed API, said smart contract being a self-executing contract with agreement terms for software API testing written into code for the smart contract, said smart contract stored on a distributed ledger blockchain;

transmitting, by the smart contract module to the generative AI process, the operability test results based on execution of the smart contract with respect to the constructed API;

storing, in the API repository, the constructed API with the constructed metadata;

removing, from the API repository, any of said combinable APIs and any of said API metadata that is obsolete in view of the constructed API;

deploying, by an orchestration module, the constructed API to the distributed ledger blockchain; and monitoring in real-time, by an API monitoring module, the distributed ledger blockchain to observe continuously performance metrics for the constructed API.

3. The artificial-intelligence merger, construction, and optimization method of claim 2, wherein the API merge and create process is initiated based on the user-request.

4. The artificial-intelligence merger, construction, and optimization method of claim 3, wherein the user request specifies requirements for the constructed API.

5. The artificial-intelligence merger, construction, and optimization method of claim 4, wherein the combinable APIs identified by the API solution cluster are combined into the constructed API by merging the combinable APIs.

6. The artificial-intelligence merger, construction, and optimization method of claim 5 further comprising the step of monitoring, by an API monitoring module, the distributed ledger blockchain to observe performance metrics for the constructed API.

7. The artificial-intelligence merger, construction, and optimization method of claim 6 further comprising the step of transmitting, by the API monitoring module to the generative AI process, the performance metrics.

8. The artificial intelligence merger, construction, and optimization method of claim 7 further comprising the step of incorporating, into the generative AI process, the operability test results and the performance metrics.

9. The artificial-intelligence merger, construction, and optimization method of claim 8 further comprising the step of mapping, to the constructed API in the API repository, future process calls to any of said combinable APIs that were rendered obsolete.

10. The artificial-intelligence merger, construction, and optimization method of claim 9 further comprising the step of providing, by the API merge and create process, developer notifications for any of said combinable APIs that were rendered obsolete.

11. The artificial-intelligence merger, construction, and optimization method of claim 10, wherein said one or more deep-learning algorithms include generative pre-trained transformer (GPT).

12. The artificial-intelligence merger, construction, and optimization method of claim 10, wherein said one or more deep-learning algorithms include abstract syntax tree (AST).

13. An artificial-intelligence merger, construction, and optimization method for application program interfaces comprising the steps of:

initiating, based on either a user request or a repository-optimization trigger, an application program interface (API) merge and create process to merge mergeable APIs stored in an API repository into a constructed API that is newly created and to remove obsolete APIs from the API repository based on the mergeable APIs that were merged;

extracting, by a metadata extraction module, application program interface (API) metadata from a distributed API repository;

analyzing, by an API analyzer module using a generative artificial intelligence (AI) process with deep learning, the API metadata to generate API clusters containing combinable APIs;

generating, by the API analyzer module using the generative AI process, telemetry for the API clusters to identify an API solution cluster for the combinable APIs based on which of the API clusters had a highest performance ranking in view of execution speed, predicted reliability, security, and scalability;

combining, by a generation module consistent with API security rules, the combinable APIs identified by the API solution cluster into a merged API with merged metadata;

testing, by a smart contract module, the merged API as a smart contract to obtain operability test results on the constructed API, said smart contract being a self-executing contract with agreement terms for software API testing written into code for the smart contract, said smart contract stored on a distributed ledger blockchain;

transmitting, by the smart contract module to the generative AI process, the operability test results;

storing, in the distributed API repository, the merged API with merged metadata therefor, removing, from the distributed API repository, any of said combinable APIs and any of said API metadata that are obsolete in view of the merged API;

deploying, by an orchestration module, the merged API to the distributed ledger blockchain;

monitoring in real-time, by an API monitoring module, the distributed ledger blockchain to observe continuously performance metrics for the merged APIs;

transmitting, by the API monitoring module to the generative AI process, the performance metrics; and incorporating, into the generative AI process using the deep learning, the operability test results and the performance metrics.

14. The artificial-intelligence merger, construction, and optimization method of claim 13, wherein the deep learning is based on a Long Short-Term Memory (LSTM) neural network model.

* * * * *